United States Patent
Fuisz et al.

(10) Patent No.: US 8,255,279 B2
(45) Date of Patent: Aug. 28, 2012

(54) METHOD AND APPARATUS FOR PERMITTING STAGE-DOOR ACCESS TO ON-LINE VENDOR INFORMATION

(75) Inventors: Richard G. Fuisz, Beverly Hills, CA (US); Joseph M. Fuisz, McLean, VA (US)

(73) Assignee: Privateer Ltd., McLean, VA (US)

( * ) Notice: Subject to any disclaimer, the term of this patent is extended or adjusted under 35 U.S.C. 154(b) by 0 days.

(21) Appl. No.: 13/108,041

(22) Filed: May 16, 2011

(65) Prior Publication Data

US 2011/0218887 A1 Sep. 8, 2011

Related U.S. Application Data

(63) Continuation of application No. 09/264,900, filed on Mar. 9, 1999, now Pat. No. 7,962,367.

(51) Int. Cl.
*G06Q 40/00* (2012.01)

(52) U.S. Cl. ........................................................ 705/26
(58) Field of Classification Search ....................... 705/26
See application file for complete search history.

(56) References Cited

U.S. PATENT DOCUMENTS

| | | |
|---|---|---|
| 4,799,156 A | 1/1989 | Shavit et al. |
| 4,992,940 A | 2/1991 | Dworkin |
| 5,319,542 A | 6/1994 | King |
| 5,535,279 A | 7/1996 | Seestrom |
| 5,537,314 A | 7/1996 | Kanter |
| 5,539,190 A | 7/1996 | Manduley |
| 5,602,921 A | 2/1997 | Ramadel |
| 5,612,527 A | 3/1997 | Ovadia |
| 5,630,125 A | 5/1997 | Zellweger |
| 5,675,784 A | 10/1997 | Maxwell |
| 5,682,427 A | 10/1997 | Seestrom |
| 5,694,551 A | 12/1997 | Doyle |
| 5,710,887 A | 1/1998 | Chelliah et al. |
| 5,769,269 A | 6/1998 | Peters |
| 5,793,972 A | 8/1998 | Shane |
| 5,794,207 A | 8/1998 | Walker |
| 5,794,219 A | 8/1998 | Brown |
| 5,826,242 A | 10/1998 | Montulli |

(Continued)

FOREIGN PATENT DOCUMENTS

EP 0986016 3/2000

(Continued)

OTHER PUBLICATIONS

PRNewswire 1, Fuisz Technologies Ltd. announces new electronic drug store, Apr. 24, 1998.

(Continued)

*Primary Examiner* — Jessica Lemieux
(74) *Attorney, Agent, or Firm* — Antonelli, Terry, Stout & Kraus, LLP.

(57) ABSTRACT

The present invention provides Internet users with access to an on-line vendor that has detailed product information some or all of which is supplied by at least one product supplier. Through selected storage and sharing of data, an on-line store is married to a supplier's product database. The on-line vendor is able to provide greater product information at a vastly reduced cost. The product supplier is provided with a unique company forum in which company activities such as sales training can be consolidated with advertising activities and product information to provide the most economical and up-to-date training information for the company.

8 Claims, 10 Drawing Sheets

U.S. PATENT DOCUMENTS

| | | | |
|---|---|---|---|
| 5,832,449 A | 11/1998 | Cunningham | |
| 5,845,255 A | 12/1998 | Mayaud | |
| 5,845,265 A | 12/1998 | Woolston | |
| 5,848,396 A | 12/1998 | Gerace | |
| 5,867,667 A | 2/1999 | Butman et al. | |
| 5,870,562 A | 2/1999 | Butman et al. | |
| 5,890,137 A | 3/1999 | Koreeda | |
| 5,890,138 A | 3/1999 | Godin et al. | |
| 5,913,210 A | 6/1999 | Call | |
| 5,923,552 A | 7/1999 | Brown | |
| 5,930,764 A | 7/1999 | Melchione | |
| 5,940,807 A | 8/1999 | Purcell | |
| 5,966,695 A | 10/1999 | Melchione | |
| 5,968,110 A | 10/1999 | Westrope et al. | |
| 5,970,469 A | 10/1999 | Scroggie | |
| 5,970,472 A | 10/1999 | Allsop et al. | |
| 5,974,395 A | 10/1999 | Bellini et al. | |
| 6,026,374 A | 2/2000 | Chess | |
| 6,029,141 A | 2/2000 | Bezos et al. | |
| 6,029,142 A | 2/2000 | Hill | |
| 6,032,130 A | 2/2000 | Alloul et al. | |
| 6,035,334 A | 3/2000 | Martin et al. | |
| 6,055,513 A | 4/2000 | Katz et al. | |
| 6,076,071 A | 6/2000 | Freeny | |
| 6,094,644 A | 7/2000 | Hillson et al. | |
| 6,108,672 A | 8/2000 | DeJoseph | |
| 6,115,641 A | 9/2000 | Brown | |
| 6,115,690 A | 9/2000 | Wong | |
| 6,115,712 A | 9/2000 | Islam et al. | |
| 6,118,860 A | 9/2000 | Hillson et al. | |
| 6,119,933 A * | 9/2000 | Wong et al. | 235/380 |
| 6,128,624 A | 10/2000 | Papierniak et al. | |
| 6,134,533 A | 10/2000 | Shell | |
| 6,141,006 A | 10/2000 | Knowlton et al. | |
| 6,141,666 A | 10/2000 | Tobin | |
| 6,141,684 A | 10/2000 | McDonald | |
| 6,154,879 A | 11/2000 | Pare, Jr. et al. | |
| 6,202,066 B1 | 3/2001 | Barkley et al. | |
| 6,219,674 B1 | 4/2001 | Classen | |
| 6,223,215 B1 | 4/2001 | Hunt et al. | |
| 6,249,772 B1 | 6/2001 | Walker et al. | |
| 6,286,043 B1 | 9/2001 | Cuomo et al. | |
| 6,292,894 B1 | 9/2001 | Chipman et al. | |
| 6,341,268 B2 * | 1/2002 | Walker et al. | 705/15 |
| 6,408,286 B1 | 6/2002 | Heiden | |
| 6,421,070 B1 | 7/2002 | Ramos | |
| 6,434,536 B1 * | 8/2002 | Geiger | 705/37 |
| 6,484,150 B1 | 11/2002 | Blinn et al. | |
| 6,594,641 B1 | 7/2003 | Southam | |
| 6,629,135 B1 | 9/2003 | Ross | |
| 6,799,174 B2 | 9/2004 | Chipman et al. | |
| 6,959,286 B2 | 10/2005 | Perkowski | |
| 6,959,288 B1 | 10/2005 | Medina et al. | |
| 6,993,572 B2 | 1/2006 | Ross | |
| 7,107,226 B1 | 9/2006 | Cassidy | |
| 7,379,899 B1 | 5/2008 | Junger | |
| 7,565,308 B1 | 7/2009 | Bollay | |
| 2001/0056377 A1 | 12/2001 | Kondoh et al. | |
| 2002/0004753 A1 * | 1/2002 | Perkowski | 705/26 |
| 2003/0139969 A1 | 7/2003 | Scroggie et al. | |
| 2004/0148366 A1 | 7/2004 | Ross et al. | |

FOREIGN PATENT DOCUMENTS

| | | |
|---|---|---|
| WO | WO 98/19259 | 5/1998 |
| WO | WO 98/20434 | 5/1998 |
| WO | WO 00/65512 | 11/2000 |
| WO | WO 01/08063 | 2/2001 |

OTHER PUBLICATIONS

PRNewswire 2, Fuisz Technologies Ltd. to acquire pharmaceutical/nultraceutical products marketer Pangea Ltd., May 21, 1997.

Robinson, J. Fruit of the Loom Stitches web service for distributors, Network world, Jun. 3, 1996.

U.S. Appl. No. 60/100,697 referenced in Patent 6,629,135 to Ross, Jr. et al. dated Sep. 17, 1998.

Liddle et al., Pizza operators might fall like Domino's for online ordering, Nation's Restaurant News, Mar. 13, 2000.

Unknown, Successful introduction leads QuikOrder to market its restaurant home delivery web site service nationally, PR Newswire, Sep. 29, 1999.

Press Release on Pizza Net, SCO and Pizza Hut announce pilot program for pizza delivery on the Internet, Aug. 22, 1994.

Parks, Flurry of online specialists reshape drug store marketplace, Drug Store News, Apr. 26, 1999, (from Dialog (R) file 570, acc. No. 01750148).

From Dialog (R) file 570, acc. No. 01751449, Cyberspace is the newest frontier in drug store retailing, Chain Drug Review, Apr. 26, 1999.

Faletra, Connecting Point booming . . . , PC Week, Apr. 24, 1989 (from Dialog (R) file 47, acc. No. 03229213.

From Dialog (R) file 18, acc. No. 01110928, Saskatchewan drug plan implements electronic card system, Computing Canada, Feb. 16, 1989.

Rogers, Did medicare pay for 'water'?, Miami Herald, Jan. 18, 1997 (from fialog (R) file 702, acc. No. 09018181).

Gallagher, Baur's southwest bank big hit with customers fleeing mega-mergers, St. Louis Post Dispatch, Jun. 23, 1997 (from Dialog (R) file 494, acc. No. 09174007).

Fried, The virtual pharmacy: Chains look to link web customers, Drug Store News, Oct. 6, 1997 (from Dialog (R) file 570, acc. No. 00020721).

Richardson, from Dialog (R) file 570, acc. No. 01111397, Pharmacists getting back on line for the nineties, Drug Store News, May 28, 1990.

Faletra, Royalty system's reign comes under attack, PC Week, Apr. 24, 1989, (from Dialog (R) file 47, acc. No. 03229212).

Parks, Cutting-edge Technology transforms chain strategies, Drug Store News, Oct. 5, 1998 (from Dialog (R) file 01694895).

From Dialog (R) file 20, acc. No. 20, acc. No. 03027580, Global media releases financing details franchising strategy for direct competition with amazon.com and CDNow, Pr Newswire, Oct. 6, 1998.

Craig, Virtual data centres to ease server strain for SMEs, Newswire, Mar. 4, 1999, (from Dialog (R) file 20, acc. No. 04521626).

Takahiro, The present and the future of an electronic ordering system at the company, S., Unisys technology review, 1993, (from Dialog (R) file 94, acc. No. 01921547).

Lin et al., Re-engineering the order fulfillment process in supply chain network, Inter. Jour. of flexible manufacturing systems, 1998, (from Dialog (R) file 34, acc. No. 07317436.

White, McKesson stakes out strategies for the future, Drug Store News, Jun. 21, 1993, (from Dialog (R) file 148, acc. No. 06494172).

From Dialog (R) file 148, acc. No. 06721905, Walgreens remains at the top (special anniversary issue: 15 years of chain drug retailing), Chain Drug Review, Sep. 13, 1993.

From Dialog (R) file 148, acc. No. 10657058, Who's using whom?, Chain store age executive with shopping center age, Nov. 1998.

MacLeod, Delivering the goods (distribution methods), Business Solutions, Sum. 1991, (from Dialog (R) file 2, acc. No. 03973909).

We et al., Research issues in supply-chain design and management: a panel discussion, Proc. of the 1996 $27^{th}$ annual meeting of the Decision Sciences Institute, Nov. 14, 1996 (from Dialog (R) file 8, acc. No. 04792371.

Mikolajczyk, Suit alleges abuse in Kmart car care, Grains Detroit Business, Jul. 26, 1993 (from Dialog (R) file 635, acc. No. 0415853).

Duffy, Glossary of messaging terms, PC Week, Oct. 12, 1992 (from Dialog (R) file 47, acc. No. 03800650).

Lewis, Building an Enterprise messaging infrastructure, PC Week, Oct. 4, 1993, (from Dialog (R) file 47, acc. No. 03961216.

Hertzberg, Earth's biggest drugstore?, Internet World, Mar. 1, 1999, (from Dialog (R) file 233, acc. No. 00528724).

Kmart Corporation, Kmart, the stuff of life, copyright 2000 (9 pages).

From http://www.drugstore.com interactive orders, and drug refills screens, copyright 1999-2002, drugstore.com.Inc.

International Preliminary Examination Report dated Apr. 15, 2002.

http://groups.google.com/, google search, kbb.com with 10 emails & responses about kbb.com back to Oct. 18, 1996.

Walters, Jennifer, A Reverse: McD's to Serve Discounts, Jan. 20, 1997.

Robin Lee, FTC: Earnings Claim May be Exempt from Disclosure Law, Apr. 7, 1997.

Kbb.com, Kelly Blue Book—Buy a new car, from URL http://www/kbb.com/, p. 1-11, copyright, 1999-2001.

Kbb.com, Kelly Blue Book—New Car Pricing, used car bluebook values, from URL http://www/kbb.com/ pp. 1-7, copyrighted 2001.

Ernst & Young & viaLink Co. BtoB E-commerce Solution, Business Wire, p. 1338, Jan. 12, 1999.

One&only4,http:/webarchive.org/web/19990224074818/http://www.oneandonlynetwork.com/,dated Feb. 24, 1999.

One&only5, Corporate profile for the One & Only network, dated Sep. 25, 1998, BusinessWire, dated Sep. 25, 1998.

Levine, Kay, Troubleshoote Column, Anchorage Daily News, Jan. 10, 1986.

One&only, Two web pages copied from IDS reference Mar. 19, 2009 including Http:/web.archive.org/web/199904220600334/http:/ww.oneandonlynetwork.com/customize.htm.

Http://web.archive.org/web/19990427193911/http:www.oneandonlynetwork.com/dated Apr. 22, 1999 and Apr. 27, 1999.

One&only2,Http:/web.archive.org/web/19990930114654/http://www.oneandonlynetwork.com/Warticle.htm?M ID=0 dated Sep. 30, 1999.

Ernest & Young article "Business-to-business electronic commerce solution for consumer packaged goods industry" dated May 17, 1999 and News release article American software expands supply chain management onto the internet dated Jan. 16, 1996.

Archived web page www.sextoy.com, May 17, 1998.

One&only, another web page Http:/web.archive.org/web/19990421114117/http://www.oneandonlynetwork.com/dated Apr. 21, 1999.

O'Harrow, Data firms getting too personal?, Washington Post, Mar. 8, 1998, (from Dialog (R) file 635, acc. No. 0912950).

From http://www.archives.org/, Internet wayback machine for rx.com, planetrx.com, soma.com, riteaid.com, and drugstore.com 1996-2002.

Chain Store, Marketing and Automotive Industry by Encyclopedia Britannica 1998.

American Software, Supply Chain Management onto Internet, News Release, Jan. 16, 1996.

* cited by examiner

METHOD AND APPARATUS FOR PERMITTING STAGE-DOOR ACCESS TO ON-LINE VENDOR INFORMATION

CROSS-REFERENCE TO RELATED APPLICATION

This application is a continuation application of U.S. application Ser. No. 09/264,900, filed Mar. 9, 1999, now U.S. Pat. No. 7,962,367, the contents of which are incorporated herein by reference.

BACKGROUND OF THE INVENTION

A. Field of the Invention

This invention relates generally to the field of dynamically linking an on-line vendor with one or more supplier networks over a network or through the Internet.

B. Background

The Internet is a worldwide system of linked computer networks that allows thousands of existing corporate and institutional networks to communicate over it using standard communications protocols or signals. That aspect of the Internet known as the World Wide Web simplified these communications even more by providing what are known as hypertext links, and using Hypertext Transport Protocol (HTTP) to allow a user to go from one hypertext link to another over the World Wide Web. (Hypertext is a way of creating and publishing text that chunks information into small units, called nodes, that have what are called hypertext links or anchors embedded in them. When a reader of the text clicks on a hyperlink, the hypertext software (also known as a browser or web browser) displays the node associated with that link. The collection of these nodes is a "web" and the Worldwide Web is a hypertext system that is global in scale.)

The Internet has spawned e-commerce. On-line vendors sell products via the Internet. E-commerce is largely dependent upon the digitization of marketing and commercial literature. Vendors spend vast sums of money digitizing information relating to products so that the users may have virtual access to the product itself. For the most part, Internet vendors compete based on the level of information provided, the format of the information and the ultimate price of the product. To date, Internet vendors have attempted to compete primarily on price and have not emphasized the ease of use of lack of ease of use of on-line shopping. As vendors have no particular interest if one product is selected over another so long as the purchase is made through the vendor, on-line product information have been overlooked.

At the same time, internal corporate networks have grown in popularity. Many companies have created vast electronic databases that contain detailed product information, promotional material, training material and sales information. These company databases generally contain highly confidential business files on the same computers that form the internal network, as well as extremely confidential technical and product files that may be vulnerable to attack and theft or misuse if a connection is made between the internal network and the Internet. Consequently, most companies construct "firewalls" between their internal networks and any gateways to the external world. Most large private networks are built of complex sets of: Local Area Networks (LAN)-a set of computers located within a fairly small physical area, usually less than 2 miles, and linked to each other by high speed cables or other connections; and Wide Area Networks (WAN)-groups of Local Area Networks that are linked to each other over high speed long distance communications lines or satellites that convey data quickly over long distances, forming the "backbone" of the internal network.

These private internal networks use complex hardware and software to transmit, route, and receive messages internally.

Sharing and distributing information inside a corporate network has been made somewhat easier by using client/server technology, web browsers, and hypertext technology used in the Internet, on an internal basis, as the first steps towards creating "intranets." In typical client/server technology, one computer acts as the "back end" or server to perform complex tasks for the users, while other, smaller computers or terminals are the "front-end" or "clients" that communicate with the user. In a client/server approach the client requests data from the server. A web server is a program that acts as a server function for hypertext information. In large private networks, a server computer might have web server software operating on it to handle hypertext communications within the company's internal network. At the web server site, one or more people would create documents in hypertext format and make them available at the server. In many companies, employees would have personal computers at their desks connected to the internal network. In an "intranet" these employees would use a web browser on their personal computers to see what hypertext documents are available at the web server. While this has been an advance for internal communications over a private network, it requires personnel familiar with Hypertext Markup Language (HTML) the language that is used to create hypertext links in documents to create and maintain the "internal" web pages. If a more interactive approach is desired, an Information Technology (IT) specialist in some form of scripting, such as CGI or PERL, is needed who can create forms documents and procedures to allow users to ask for information from the server.

Another option that became available to an information publisher after the advent of the Internet and Web browsers was a form of connection over the Internet that provides secure access, but usually to a more limited set of information, through a "demilitarized zone" or DMZ, using encryption and secure sockets. Since each company would want to protect the privacy of the internal data on its network, each would have a firewall around its network with a "demilitarized zone" (DMZ) outside or as part of the firewall for each other company it wished to reach.

All of these options however have prevented one important marriage of technology that has heretofore eluded the Internet vendor, the selected sharing of supplier and vendor information. Internet vendors have been unable to gain access to supplier information because of cost, security and competition concerns. This has deprived Internet vendors of access to the vast wealth of digitized information already available from product suppliers and has deprived the product supplier of real-time access to purchaser information.

On-line vendors are unable to give detailed product descriptions without incurring huge costs for entering and verifying the accuracy of product information. This problem is of great concern of on-line drugstores. Health products and medicines often have a wealth of information that customers may deem important when choosing the correct medication. For example, cold and flu medicines available to the user are often specifically designed for different types of symptoms. In addition, some medication such as ibuprofen may or may not be preferable to take over acetaminophen depending on certain health factors of the user. On-line vendors, including drugstores, have heretofore been unable to provide the user with economical access to this detailed information and have instead opted for generic product descriptions that provide minimal customer information. Customers must essentially know the product they want rather than shop on-line for a product that meets their needs. It is an object of the present invention to solve this and other problems by dynamically linking on-line vendors and suppliers to the mutual benefit of each party and to the consumer.

SUMMARY OF THE INVENTION

The present invention is designed to solve these and other problems traditionally associated with Internet commerce. The present invention provides Internet users with access to an on-line vendor that has detailed product information some or all of which is supplied by at least one product supplier. Through selected storage and sharing of data, an on-line store is married to a supplier's product database. The on-line vendor is able to provide greater product information at a vastly reduced cost. The product supplier is provided with a unique company forum in which company activities such as sales, training, marketing and/or management can De consolidated with an on-line vendor to provide the most economical and up-to-date training information for the company. Moreover the detailed product information that is made available may be used by the user or by a product selection device to assist the user is identifying those products that are of greatest interest.

The on-line vendor selectively stores customer information and preferences in multiple or segregated databases. A supplier database is provided that contains a shared on-line vendor database and company specific database. Through a distributed architecture system (CORBA, JAVA, JAVA BEAN or the like) a multiple tiered access hierarchy is provided in an Internet vending site that permits data to be selectively shared between users. The present invention allows an on-line vendor and supplier to selectively share information concerning the vendor's product. The present invention also permits an overall reduction in the number of databases that contain product information. The creation of a company specific database that is dynamically tied to the on-line vendor also permits training and other supplier needs to be serviced by the on-line vendor.

It is therefore an object of the present invention to provide an on-line vendor that is capable of executing e-commerce and to provide a supplier database from which the on-line vendor can selectively extract product information that is of interest to the on-line vendor's customers.

It is another object of the present invention to provide a product supplier database that is restricted to supplier authorized access. It is an object of the present invention to provide supplier authorized users with access to the supplier database and selected portions of the on-line vendor database.

It is another object of the present invention to provide a third party database that comprises information or links to information of interest to on-line customers or to one or more suppliers. For example, data concerning recent flu incidence or cold outbreaks.

It is another object of the present invention to provide a suppliers with a sales and employee training capability that utilize data collected and managed by the on-line vendor.

It is another object of the present invention to permit suppliers to dynamically control the advertising and on-line representation of their products.

It is another object of the present invention to reduce the cost of running an on-line vendor site by sharing information with one or more product suppliers.

It is another object of the present invention to permit users of the on-line database with access to detailed product information actively updated by the product supplier.

It is another object of the present invention to permit product suppliers to obtain detailed information concerning purchaser's opinions of their products through questionnaires, chat forums, product questions or product suggestions.

It is another object of the present invention to provide diagnosis questionnaires that permit a user to describe the symptoms for which a product is required and receive multiple suggestions of products that may be of interest to the customer. It is an object of the present invention to permit the detailed product information supplied by the product supplier to be used in determining which product may or may not be suggested to a particular user.

DETAILED DESCRIPTION OF THE DRAWINGS AND OF THE PREFERRED EMBODIMENT

The present invention combines an on-line vendor and at least one product supplier. Although the present invention will described with respect to an on-line drugstore (www.rx-drugstore.com) those of ordinary skill in the art will recognize that the present invention may be used by any on-line vendor that sells one or more products that contain relatively detailed descriptions of the items sold.

The present invention combines three systems: an on-line drugstore, a supplier's proprietary database and a management system. Although the systems will be described separately and dynamically linked, those of ordinary skill in the art will recognize that hardware may be shared by multiple portions of the system. For example, although multiple databases may be refereed to, it is possible to combine the databases with suitable partitioning or segregation, including the use of selective encryption. The same is true for other elements of the hardware such the Internet servers (Netscape servers) or the processors (SunMicrosystem Workstations).

Figure 1:
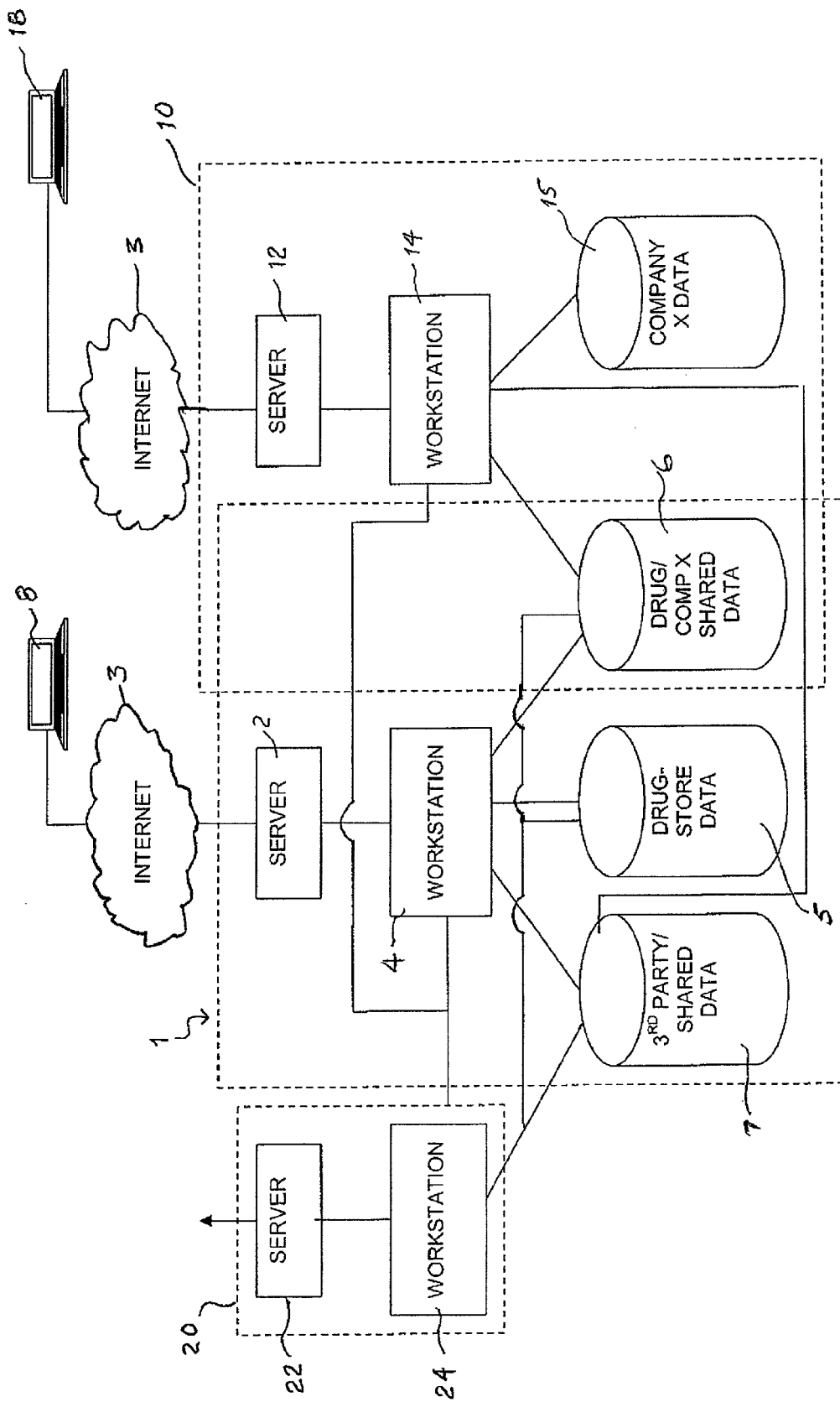
FIG. 1 is a schematic of a stage door implementation.

As shown in FIG. 1, in one embodiment the on-line drugstore 1 comprises a NetScape ES Server 2 connected to the Internet 3. One or more servers 4 (SunMicrosystem workstations) are provided that link web pages displayed to users to one or more databases 5, 6 and 7. A distributed architecture systems (CORBA, Java Bean, etc) system may be used to dynamically link users 8 to the product databases 5, 6 and 7.

In one preferred embodiment a product supplier will have a company specifics site 10. To ensure confidentiality of the data, much of which is highly sensitive a separate Internet access (stage-door) is provided designed specifically for the product supplier, a separate Internet access is provided 10 for a company authorized user 18. Thus, a second NetScape Internet Server 12 may be provided with its own IP address. A second server (SunMicrosystem workstation) may be provided 14, that is dynamically linked to a company specific (proprietary) database 15 and a shared on-line vendor database 6.

A distributed architecture system implemented in both of the servers 4 and 14 are used that dynamically link on-line vendor databases with company specific databases. Because the present invention may have several added features that are either implemented across the entire system or selectively by vendor, it is expressly contemplated that a multiple layer distributed object system may be used. Thus, a first layer of objects may include basic web page formats. The second layer may include data identifiers that are included in each web page. A third layer of objects may be used to retrieve and if necessary convert the data that belong in the web page. A management program 20 may be used to replace data or include an additional layer of objects that assists in extracting the relevant data, which may vary by user or product supplier. It expressly contemplated that data may require conversion and hence conversion of data may be required (such as ATAPI interfaces).

Data maybe managed by a separate management workstation 24 and server 22. Data read/write access may be limited by the management server or through the use of selective low level encryption. By bringing separate networks together under one management regime, data can be selectively shared to the mutual benefit of all those involved. Thus it is expressly contemplated that multiple vendors and product suppliers can be included in this system such that one management system may be used to selectively share data amongst the participating systems.

Figure 2:
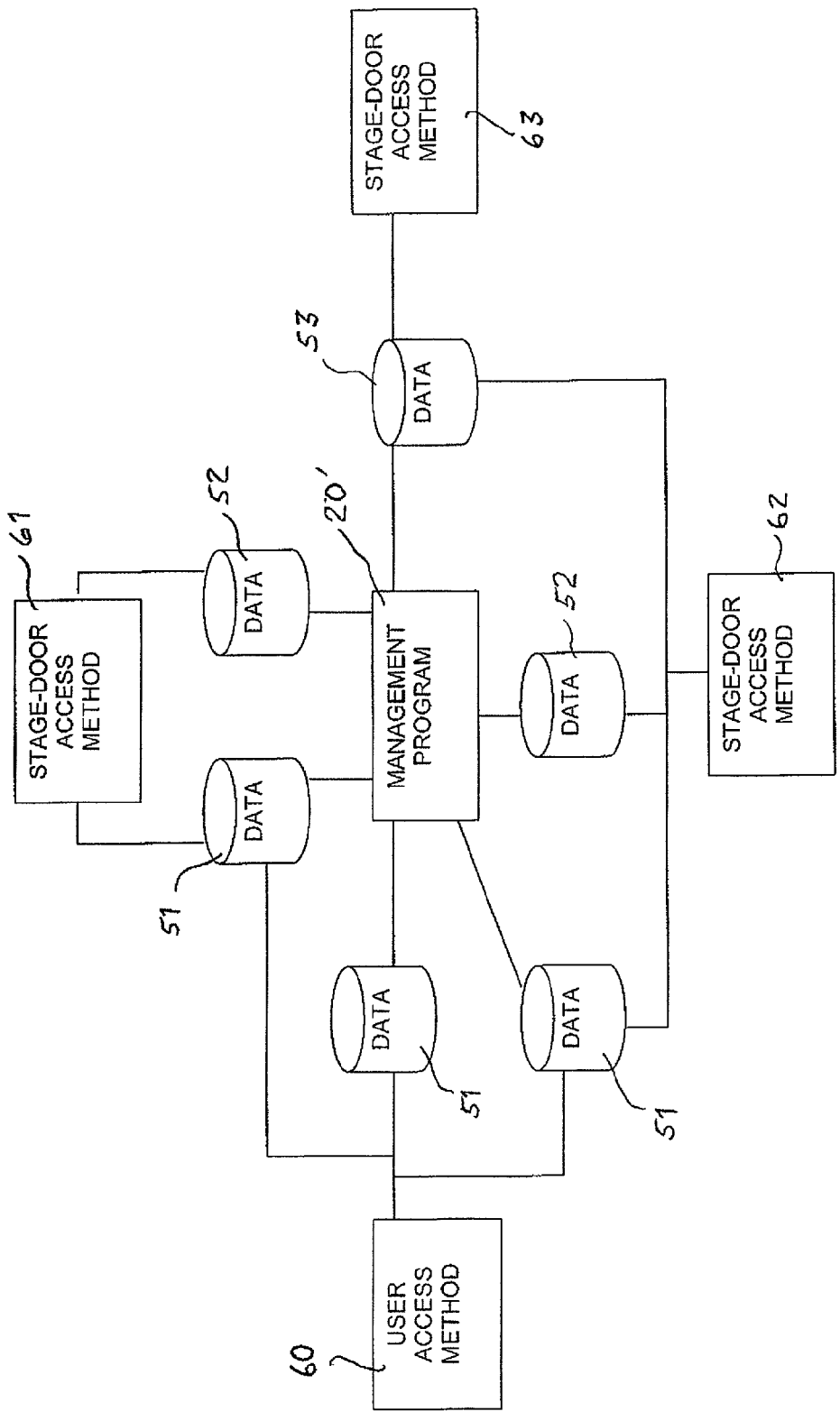
FIG. 2 is a schematic of as multiple stage door implementation.

As shown in FIG. 2, the present invention is not limited to a single stage door but may have multiple stage doors. A management program 50 may be used to control user access 60 to on-line vendor databases. A first stage door 61 may be provided with access to at least one shared database 51 and a company proprietary database 52. A second 62 and third 63 stage door may be provided for a parent and subsidiary that permit access to shared databases 51 and company proprietary databases 52 and 53.

A. RxDrugstore User

The present invention is a combination of an on-line vendor 1 and product supplier 10 and a management program 20 that dynamically interactively uses the systems. Although the present invention will be describes with respect to an on-line drugstore it is not limited to use with drugstore sales and may be used in any other on-line vending system.

As shown in FIG. 1 a user to www.rxdrugstore.com enters the site through the Internet. The on-line vendor site, which in this specific example is a drugstore, can be set up in numerous ways, as those of ordinary skill in the art will appreciate. The focus of the present invention is the linking of an on-line vendor with at least one third party that is permitted with selected access to on-line vendor information and which provides the on-line vendor with access to the selected third-party data.

Figure 3:
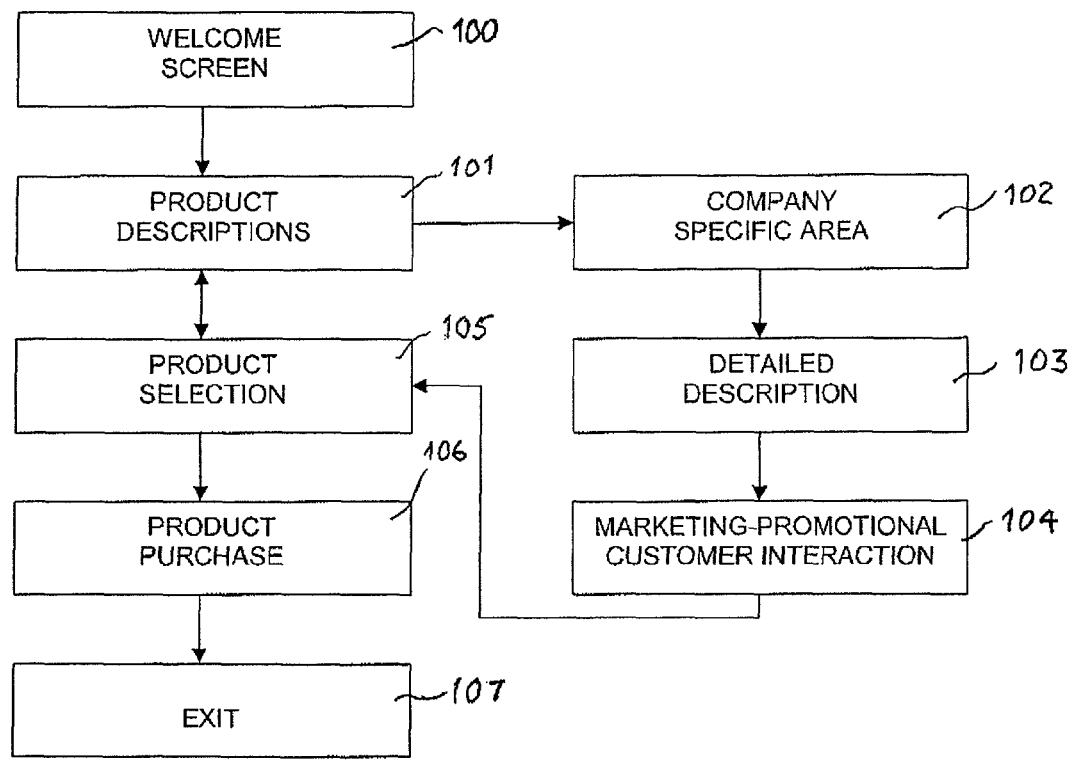
FIG. 3 is a flow diagram of a user on-line vendor interface.

Upon arriving at the on-line site 100 the user can negotiate through a series of web pages. The user may select a category as shown in FIG. 3 and obtain a selection of available products 101. Product descriptions are provided at 101. If a user wants to enter a company specific area 102 the user can obtain access to company (supplier) supplied data and obtain a detailed description or detailed information concerning the product 103. Addition, information such as marketing, promotional or third party data (such as flu incidence) can be supplied to the user at 104. The user is then navigated through product selection 105, product purchase 106 and then exits the system 107. Those of ordinary skill in the art will recognize that this is simply one of many ways of permitting the user to interact with supplier provided data and that the present invention is not limited to this particular disclosure.

At least two levels of product information are available. A user may have access to general information and company specific information. Although the user can be sent to a detailed product description maintained by the drugstore, it is expressly contemplated that a supplier specific web page can be provided. By requesting additional information on a product, a user can be directed to the supplier area (company specific area). In the supplier area the site and content is expressly managed for the supplier's use. Thus, the supplier may provide detailed product descriptions, marketing to other promotional information to the user. This permits the user to have access to a greater level of product information without having to leave the drugstore.

Alternatively, product data can be imported into a predetermined web page format. The product data can be taken from the product supplier database. Those product suppliers that have provided access to product data will have a greater level of information available to the user. Each web page is dynamically linked through the use of distributed object architecture to data. For example, a web page in which cold medicine is displayed may contain links to data sources that make up the web page. The data sources may be stored on different databases, such as databases identified by different product manufacturers. The use of a distributed architecture system permits product data to be update and changed without having to change the web page structure. Web pages are then sent to the user.

Product selection is aided in the present invention through access to greater product information. Thus, a user may select a product and request greater information, perhaps a detailed description on how often the product needs to be taken. The individual product description pages may be designed by or with the assistance of the product manufacturer. The user is essentially taken into a product manufacturer site that links detailed product information provided in part by the product manufacturer with price and other information maintained by the on-line vendor.

To limit dissemination of the user's identify to all suppliers, a user identifier may be assigned to the user. The identifier is used to track a user's selections, internal hits or any other data that is monitored or collected. User identification data if available can be disseminated to the product suppliers or profiles may be constructed which are then used in the data sharing process. For example, if a user's sex is known, the supplier do not need to provided with access to whether Jane Doe is female. Instead the user data may be incorporated into the statistical gathering such that supplier X knows that 60% of all purchasers of product X are female. User profiles or personal data may be purchased from marketing firms and shared by product suppliers within the vending system.

Because additional user data is provided and specific vendor areas are available within the system, several unique features can be provided to enhance the user's buying experience.

B. User Preference Program

Figure 4:
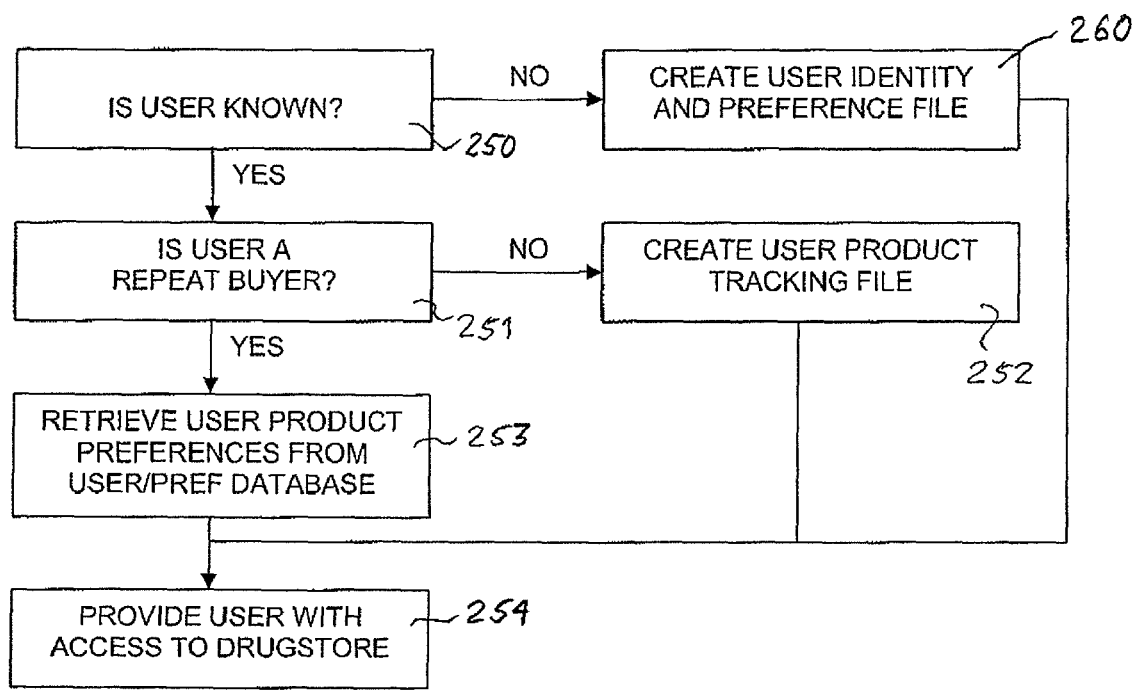
FIG. 4 is a now diagram of a user preference optional subroutine.

As shown in FIG. 4 the present invention may include, but does not have to include, a user preference monitoring program. The goal of on-line vendors is not to have a user make one purchase and never to return. Rather, the goal is to have user's return and make multiple purchases. The present site may track user and their preferences to assists in site design as well as to collect information concerning general customer preferences.

As shown in FIG. 4 a user preference program may be provided that track user product preference. When a user enters the system a determination is made whether the user is known 250. If the user is not known, a user preference file is created 260. If the user is known and is a repeat buyer 251, a more detailed user preference file may be created 252. The user's preference file is retrieved at 253 and the user is provided with access to the on-line database 254.

Figure 5:
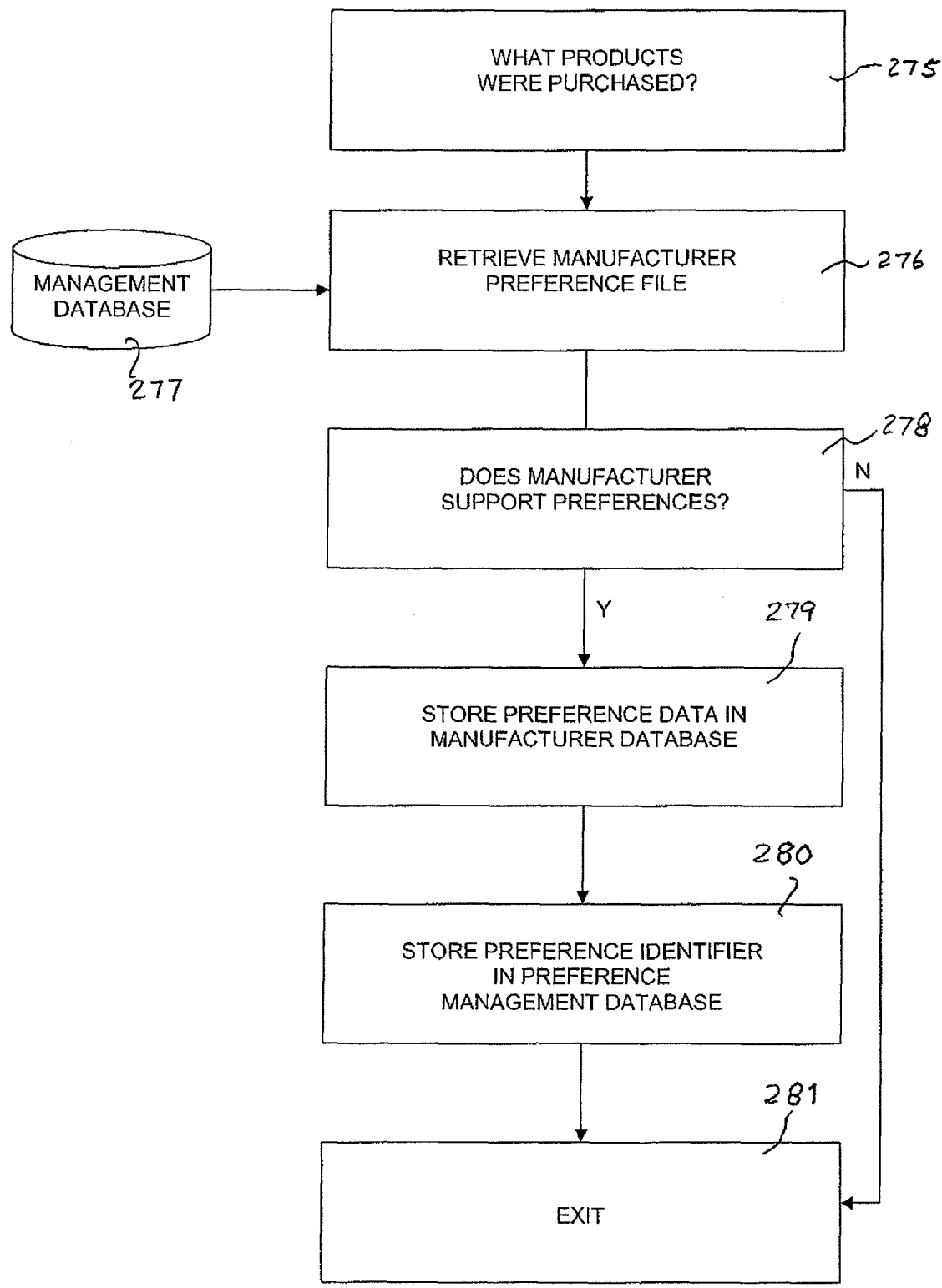
FIG. 5 is a flow diagram of a user preference optional subroutine.

The preferences may comprise a list of the type of products that the user has purchased and the frequency of those purchases. To limit the amount of data stored, user preferences may be deleted at a predetermined interval so as to track a predetermined window of customer preferences, such as two or six months. It is expressly contemplated that user data may be maintained with the assistance of the product suppliers so that those suppliers as shown in FIG. 5. Thus, a preference file for supplier X may be available for six months whereas a preference file for supplier Y may be available for one year. By storing user preference data based on supplier or product information, it is possible to provide preference data that varies based on the product or supplier involved. Thus when a user purchases products a query is made what products were purchased 275. The manufacturer's preference file parameters are retrieved 276 from the manufacturer's database 277. If the manufacturer supports preference files 278, the preference data is stored 279 together with a customer identifier 280 prior to exiting the preference subroutine at 281.

A user preference database may be stored as a single database or may comprise multiple entries in supplier databases that are dynamically linked or may be a combination of both. If user preferences are stored by supplier database when the data is retrieved a query of all supplier databases may be made to determine if the user has a preference stored thereon. It is expressly contemplated that user's preferences may be stored in batch mode and that individual files are not necessary. For example, all users that have purchased product from supplier X may have an identifier, which may be different from their identity, stored in a supplier X preference file. The preference retrieval process may comprise searching supplier preference files for the user's identification. Presence in the database can be used to construct a preference profile. The preference profile may then be used to construct the user's preference data that may be supplied in a predetermined web page.

Figure 6:
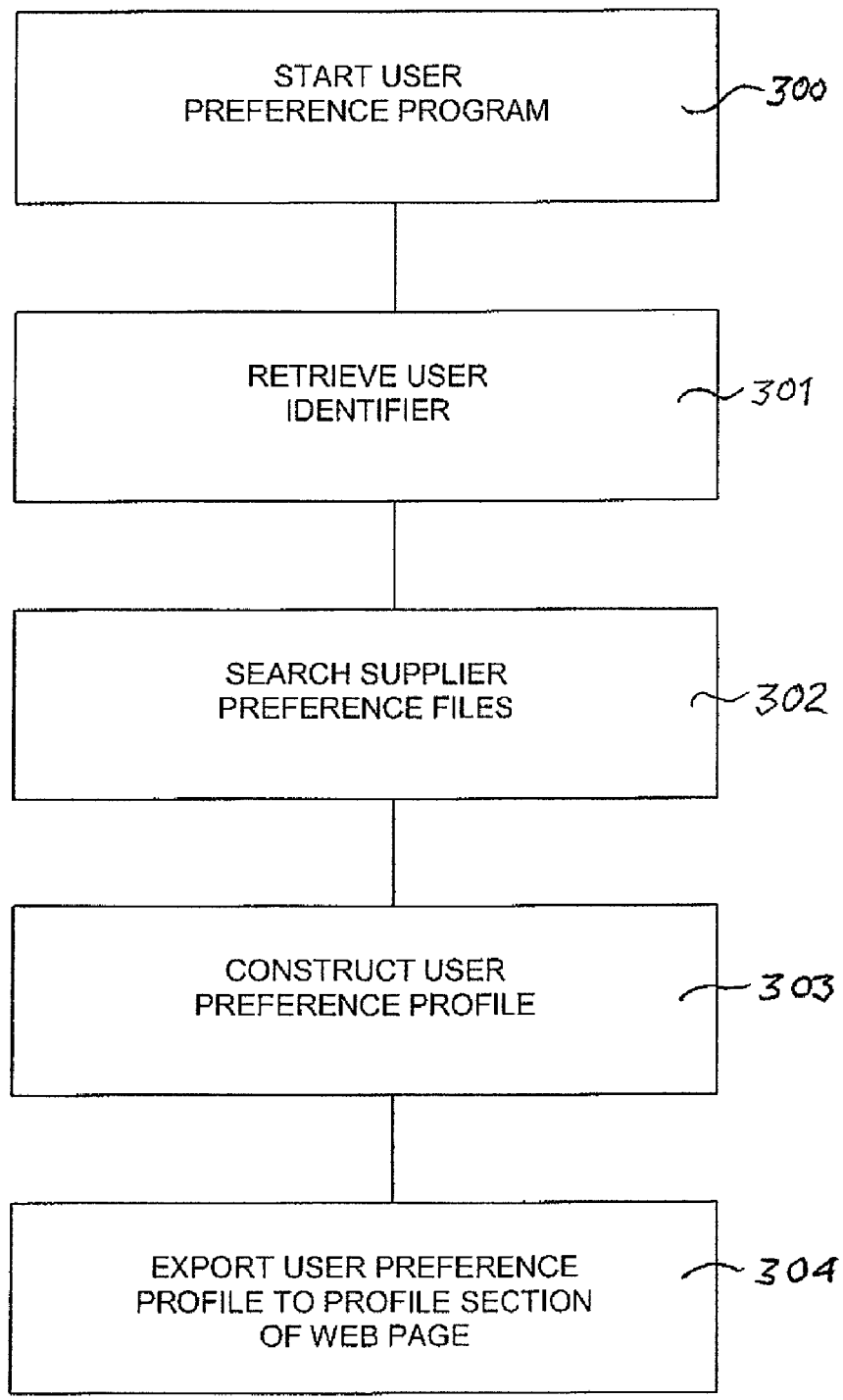
FIG. 6 is a flow diagram of a user preference optional subroutine.

As shown in FIG. 6 when the user preferences are retrieved 300 the first step is to retrieve the user identifier 301. A search of the manufacturer preference files 302 is made at which point the preference file is constructed at 303 and the preference file is exported to the management or on-line vendor database at 304.

Product preferences may be classified by vendor or product type. This information may be shared with product suppliers to assist in marketing, training or sales activities. Preference data may be used to assist in vendor sponsored advertisements or programs offered to users. For example, a user that has a preference for company X's products may have an interactive banner placed in the product screen to assist the user is identifying the type of product they would like to purchase form Company X. In addition, supplier sponsored reminder programs or product discounts may be provided.

C. Product Purchase Storage/Trends

Figure 7:
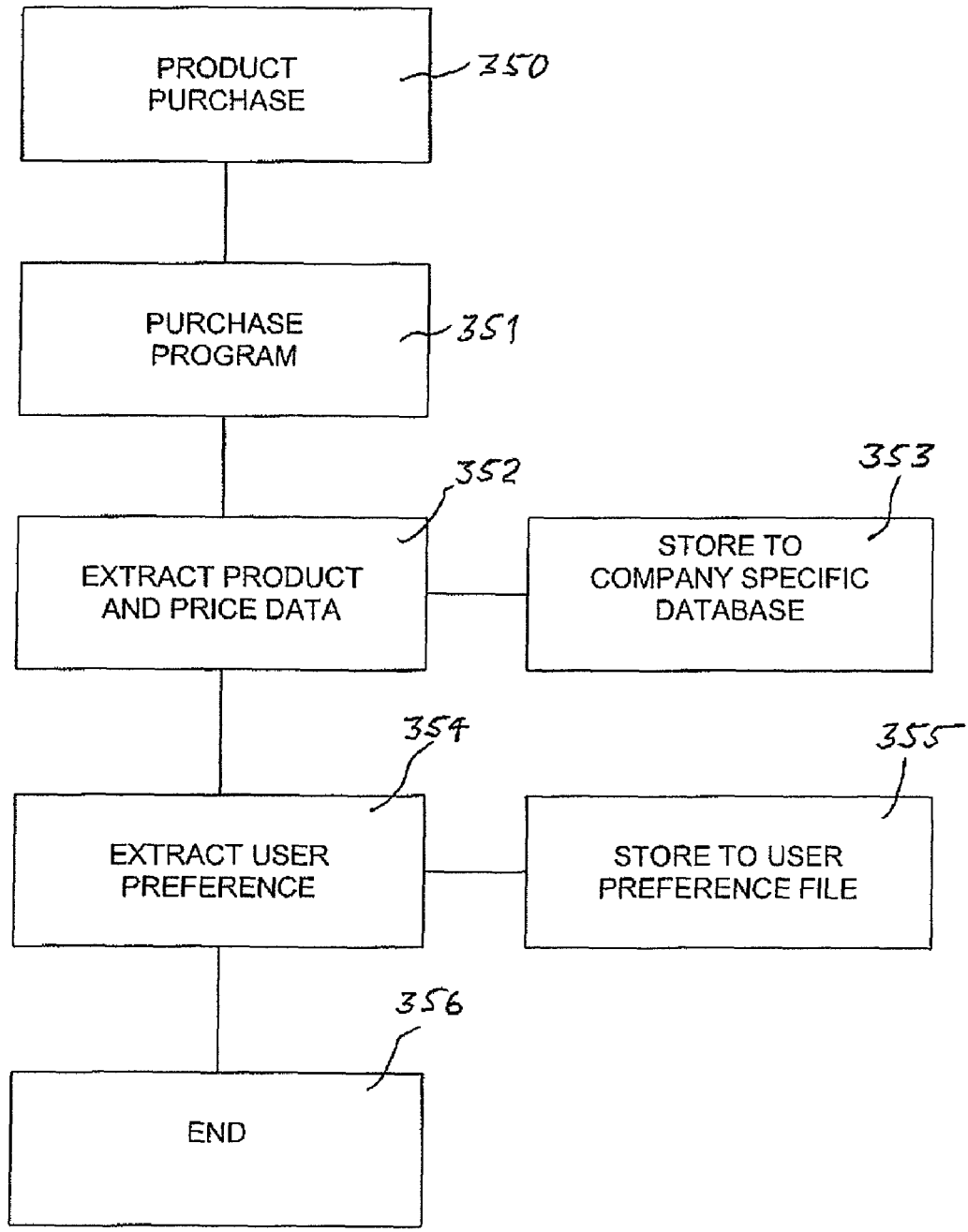
FIG. 7 is a flow diagram of a product purchase optional subroutine.

The present invention may include, but does not have to include, a product purchase trend program. As shown in FIG. 7, the most basic type of information a product vendor is likely to want is access to data concerning actual sales of that vendor's products. Although as information is commonly available through re-ordering of products, the present invention permits real-time access to product sales ands trends. This may be combined with third party data from product distributors or with marketing and advertising data to correlate product sales and trends. In addition, the relative rate of the products sales as compared with competing products may be provided to assist the product vendor in identifying how their product is doing in the market place.

A product purchase subroutine is started at 350. The purchase program is monitored at 351 and product information is extracted at 352. Product information is stored in a company specific format 353. User preferences 354 can also be extracted at this time and stored to the preference file 355. The subroutine is then exited at 356.

Figure 8:
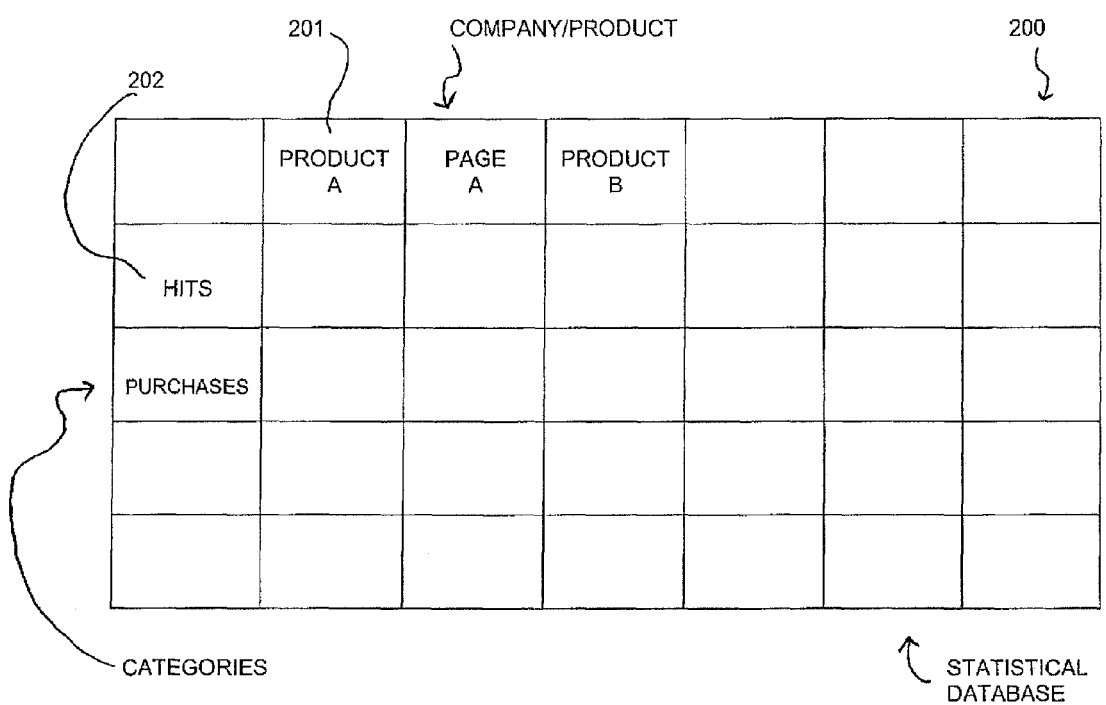
FIG. 8 is a diagram of a statistical database.

As shown in FIG. 8, a statistical database 200 can be maintained that correlates products and manufactures 201 with hits, purchases, product returns and other data 202. Statistical data can be retrieved from the statistical database in a variety of ways. Individual product statistics can be provided for a given product or supplier. In addition, statistics can be generated comparing a product or manufacturer to competing products or manufacturers. Mean statistical information can be generated and used to compare the relative performance of a given product or company.

D. Internal Hit Monitoring

Figure 9:
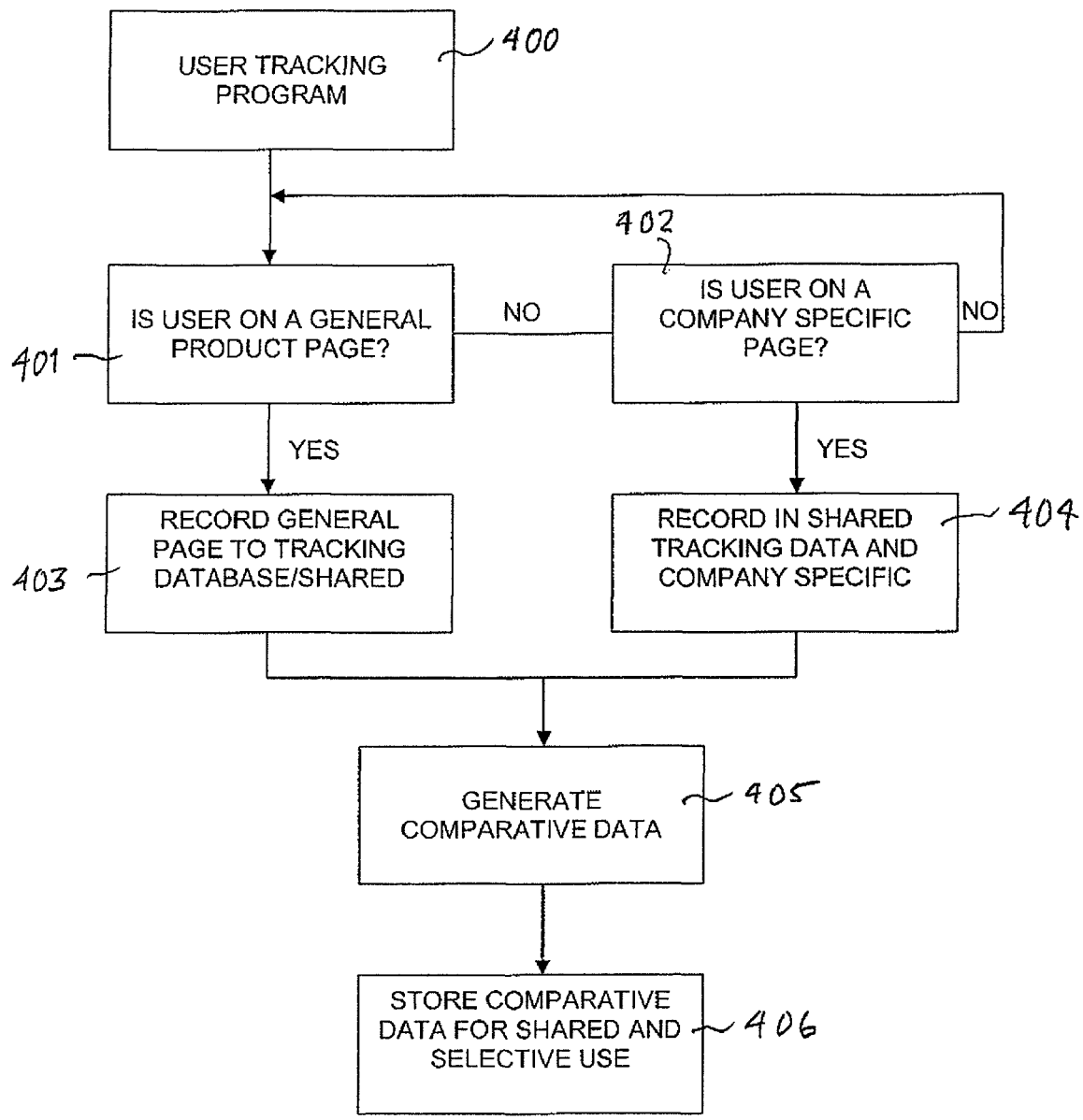
FIG. 9 is a flow diagram of an internal hit tracking subroutine.

As shown in FIG. 9, the present invention may include, but does not have to include, an internal hit monitoring program. It is expressly contemplated that multiple vendors will have company specific web pages in the on-line vendor. As shown in FIG. 9 to keep track of user preferences, vendor preferences, trends, etc., it is expressly contemplated that an internal hit monitoring program may be implemented.

If hit tracking is implemented at 400, each web page is queried for whether is contains general product data 401. If it does not, a further query is made to see if it contains company specific data 402. General page tracking 403 and company specific tracking 404 is recorded accordingly. Comparative data may be generated at 405 and the data store for selective use 406. Data queries can be extracted by monitoring the amount of data requested out of the respective databases as opposed to monitoring individual web pages. By selective storage of data amongst the databases, hit information can be extrapolated as if web pages were monitored. Alternatively, this process can be implemented into the distributed object architecture in a variety of ways, as those of ordinary skill in the art will appreciate.

Internal hits may be compared to establish trends, such as preferred products, types of products or vendors. Internal hits for each vendor as a function of the total hits for the web site may also be generated. This information may be selectively shared with the product vendors to assist in effectively advertising or placing their products.

E. Indication/Product Selection/Value Added Services

Because multiple forms of data are collected, a number of value added services can be provided to the on-line site user. Value added services may be provided, in frames, as a separate web page or in interactive banner advertising selectively placed in the site. These value added services may be incorporated directly into the web pages or may be provided as links to other web pages.

One value added services is product selection assistance. For example to assist is selecting medication to purchase or review, an indication questionnaire may be provided. A series of basic questions concerning the user's symptoms may be asked and products, by multiple suppliers or the sponsoring supplier may be shown to the user. It is expressly contemplated that this type of value added service can be provided in interactive banner advertising or in frames such that the user can have the benefit of the value added services without having to negotiate through a series of new web pages. The product assistance subroutine may search product descriptions for matching indications or provide the user with a list of indications that are mentioned in the products which the vendor supports. It is expressly contemplated that a vendor may have multiple product assistance subroutines set up that search based on supplier. Thus, for example a search of runny nose and headache maybe made of company X's products only.

A remind feature may also be added. It is expressly contemplated that user preference data may be used to either remind a user that they may need to buy a product, such as razors, or that a vendor that sells a type of product the customer has purchased in the past is offering a sale. Product quantities and recommended usage may be used to calculate whether the user should be reminded of the potential need for a product. Thus, a purchase of five blades of razors will be reminded to re-purchase razors twice as often as a purchaser of ten razors. Individual re-ordering patterns can be extracted from the preference file to determine the user's use patterns, for example whether the user switches razor blades every other day or every week. The remind feature may also be tied to the manufacturer's recommend use to remind a user to purchase a product more often or to replace a product that the user has had for a predetermined period of time.

Supplier questionnaires or chat sessions may be incorporated into the site. A supplier may design a questionnaire concerning product likes and dislikes so as to assist in the design of new product or in the modification in existing products or advertising. This interactive information gathering with a user predisposed to either buy the vendor's product or a competing product permit product data collection to be efficiently gathered.

In addition, value added services may include access to third party (non-supplier) data. It is expressly contemplated that data such as weather, flu incidence, crisis information and other third party data that may be of interest to the drugstore users and/or the product suppliers may be provided. This information may be made selectively available to drugstore users and product suppliers.

F. Stage-Door

Product supplier sites are tied to the on-line vendor system so that maximum data can be shared between the two systems. The sharing of data permits data costs to be shared and permits information to be efficiently used. The present invention can be used to permit a product supplier's sales, marketing, R & D, training or other company databases with the on-line vendor. The present invention is not limited to the sharing of these types of information and may share any type of information that can be used to complement both systems.

Figure 10:
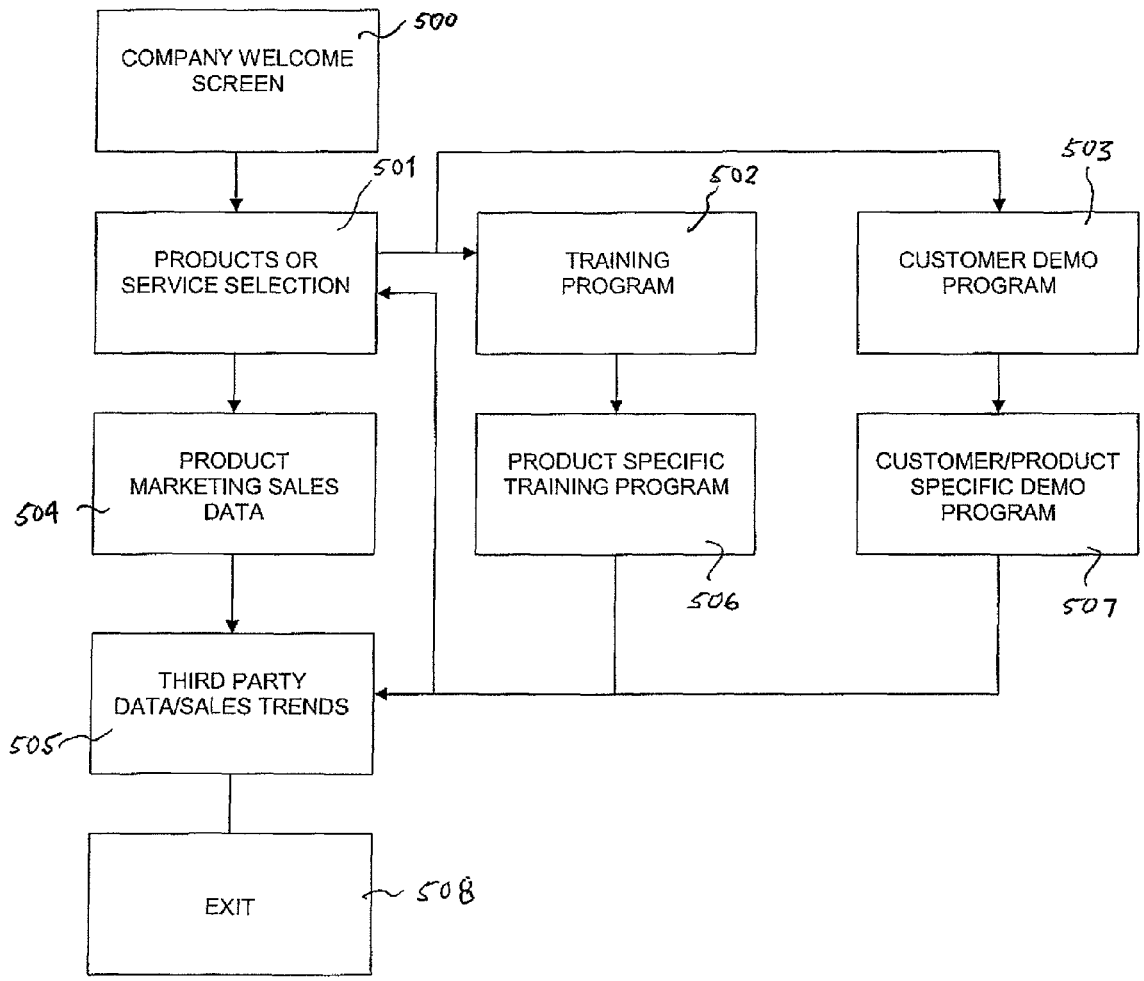
FIG. 10 is a flow diagram of a stage door interface.

As shown in FIG. 10, the present invention permits data to be shared by providing different access methods for different users, stage-doors. A product supplier may have a stage-door 500 that permits only authorized users with access to proprietary company data while at the same time permits those user with access to shared data from the on-line vendor. Upon access to the company specific site, the user may have the option of entering a product screen 501, a training program 502 or customer demonstration programs 503, as well as any number of specific features the company desires. Depending on the feature accesses, product marketing information may be retrieved 504, training information 506 or customer and product information 507, or third-party data 505. The data and services can be provided solely on the company specific site or in combination with, or solely on, the on-line vendor site. The maintenance of both sites in combination permits detailed data to be captured, computed and provided at minimal costs.

Company web pages may be maintained in a similar manner to the on-line vendor web pages. Web page data requests may be linked to either to a proprietary company database or to a shared database. On-line data may include, but is not limited to, the following:

Sales trends (both on-line and from distributors);
Ratio of product sales vs. competitors;
Ratio of product sales vs. product. category sales;
Ratio of repeat on-line buyers vs. competitors;
Number of user's visiting company specific web pages;
Number visiting company specific web pages;
Ratio of product returns or complaints vs. competitors or product category;

and

Third party data (which can also include self calculated data including but not limited to epidemic outbreaks, weather, health trends, flu incidence, cold incidence or allergen content) vs. product sales.

The above noted statistics, as well as other statistics, may be obtained by computing (or gathering) the number of total events and comparing it to a particular product or category of products. Alternatively, a product or category of products can be compared to any other product or category of products. Product trends may be calculated over multiple time frames for days, weeks, months or years. Trends and product data that require extended storage may be integrally-stored with the company data in a manner to that described above with user preferences. By dynamically linking company proprietary data and shared data, a company authorized user may access a single web site and obtain comprehensive information. Sales training and marketing databases may be integrated into the window so that a portion of the material is the same or similar to that used by an on-line vendor user who views the same product.

By using a distributed object architecture the company web site may be designed specifically for the company. The source of the web page data may be managed by the objects alone or in combination with back-end systems or management programs. By combining databases and by sharing information, multiple computerized systems may be condensed and efficiently implemented.

By designating information as sharable or proprietary a company can interact with an on-line vendor and effectively share the costs for maintaining and using the data while at the same time obtaining additional information which would otherwise not be available. If multiple suppliers participate, each company has its proprietary data maintained while at the same time share common information.

Those of ordinary skill in the art will recognize that the present invention has wide commercial applicability to Internet and network commerce. Those of ordinary skill in the art will recognize that the present invention is not limited to the specific examples describes herein and may be modified while staying within the purpose and intent of the present invention.

The invention claimed is:
1. An on-line vendor system, comprising:
an on-line vendor system that may be selectively accessed by an on-line vendor user and comprising at least data relating to a selection of available products for sale by the on-line vendor and at least one database containing on-line vendor user information related to at least one of user preferences of on-line vendor users, product purchase trends of on-line vendor users and internal hits of on-line vendor users;

a product supplier system maintained by a product supplier;

a management system dynamically connecting the on-line vendor system and the product supplier system for selectively controlling access by the product supplier to the at least one database containing on-line vendor user information of the on-line vendor system.

2. The on-line vendor system according to claim 1, wherein the at least one database containing on-line vendor user information contains information related to user preferences of on-line vendor users.

3. The on-line vendor system according to claim 2, wherein the information related to user preferences of on-line vendor users comprises information concerning the type of products purchased and the frequency of purchases.

4. The on-line vendor system according to claim 1, wherein the at least one database containing on-line vendor user information comprises information related to product purchase trends of on-line vendor users.

5. The on-line vendor system according to claim 4, wherein the information related to product purchase trends of on-line vendor users includes information concerning product purchase trends of products supplied by the product supplier.

6. The on-line vendor system according to claim 5, wherein the information related to product purchase trends of on-line vendor users includes information concerning the relative rate of sales of a product of the product supplier with the relative rate of sales of a competing product.

7. The on-line vendor system according to claim 1, wherein the at least one database containing on-line vendor user information contains information related to internal hits of on-line vendor users.

8. The on-line vendor system according to claim 7, wherein the information related to internal hits of on-line vendor users includes at least one of general page tracking, tracking of pages of the product supplier, and an amount of data requested by on-line vendor users.

* * * * *